United States Patent
Sassara et al.

(10) Patent No.: US 11,971,776 B2
(45) Date of Patent: *Apr. 30, 2024

(54) REAL-TIME TRIGGER TO DUMP AN ERROR LOG

(71) Applicant: Micron Technology, Inc., Boise, ID (US)

(72) Inventors: Alberto Sassara, Naples (IT); Basso Francesco, Portici (IT); Crescenzo Attanasio, Acerra (IT); Massimo Iaculo, San Marco Evangelista (IT)

(73) Assignee: Micron Technology, Inc., Boise, ID (US)

( * ) Notice: Subject to any disclaimer, the term of this patent is extended or adjusted under 35 U.S.C. 154(b) by 44 days.

This patent is subject to a terminal disclaimer.

(21) Appl. No.: 17/670,292

(22) Filed: Feb. 11, 2022

(65) Prior Publication Data

US 2022/0164249 A1 May 26, 2022

Related U.S. Application Data

(63) Continuation of application No. 16/989,316, filed on Aug. 10, 2020, now Pat. No. 11,269,708.

(Continued)

(51) Int. Cl.
*G06F 11/07* (2006.01)
*G06F 13/16* (2006.01)

(52) U.S. Cl.
CPC ...... *G06F 11/0778* (2013.01); *G06F 11/0727* (2013.01); *G06F 11/0751* (2013.01); *G06F 13/1668* (2013.01)

(58) Field of Classification Search
CPC .......... G06F 11/0778; G06F 11/0727; G06F 11/0751

(Continued)

(56) References Cited

U.S. PATENT DOCUMENTS

| 5,652,914 A | 7/1997 | Eckert et al. |
| 5,664,219 A | 9/1997 | Glassen et al. |

(Continued)

FOREIGN PATENT DOCUMENTS

| CN | 101652751 | 2/2010 |
| CN | 101719090 | 6/2010 |

(Continued)

OTHER PUBLICATIONS

"Chinese Application Serial No. 202011588945.1, Office Action dated May 31, 2022", with English translation, 10 pages.

(Continued)

*Primary Examiner* — Chae M Ko
(74) *Attorney, Agent, or Firm* — Schwegman Lundberg & Woessner, P.A.

(57) ABSTRACT

In various embodiments, techniques can be provided to address debug efficiency for failures found on an operational system. The techniques can utilize a real-time trigger to notify a memory device to dump an error log to timely capture all needed information. In response to detecting one or more error conditions associated with the memory device, a system that interfaces with the memory device can generate a trigger signal to the memory device. In response to identifying the trigger signal, the memory device can dump an error log of the memory device to a memory component in the memory device. The error log can later be retrieved from the memory component for failure analysis.

20 Claims, 7 Drawing Sheets

Related U.S. Application Data

(60) Provisional application No. 62/955,280, filed on Dec. 30, 2019.

(58) Field of Classification Search
USPC .................................. 714/38.11, 45, 48, 49
See application file for complete search history.

(56) References Cited

U.S. PATENT DOCUMENTS

| | | | |
|---|---|---|---|
| 7,418,635 | B2 | 8/2008 | Schulstad |
| 7,644,261 | B2 | 1/2010 | Hsieh |
| 8,978,012 | B1 | 3/2015 | Poole |
| 10,664,402 | B2 * | 5/2020 | Herrera ............... G06F 12/0868 |
| 11,269,707 | B2 | 3/2022 | Liang et al. |
| 11,269,708 | B2 | 3/2022 | Sassara et al. |
| 11,829,232 | B2 | 11/2023 | Liang et al. |
| 2006/0033541 | A1 | 2/2006 | Ishikawa |
| 2006/0067123 | A1 | 3/2006 | Jigour et al. |
| 2006/0168471 | A1 | 7/2006 | Schulstad |
| 2007/0106915 | A1 | 5/2007 | Shie |
| 2010/0287414 | A1 | 11/2010 | Pardoe et al. |
| 2012/0216079 | A1 | 8/2012 | Fai et al. |
| 2012/0239973 | A1 | 9/2012 | Walton et al. |
| 2012/0246518 | A1 | 9/2012 | Francis et al. |
| 2013/0111299 | A1 * | 5/2013 | Hashimoto ......... G06F 11/1068 714/E11.032 |
| 2013/0212425 | A1 | 8/2013 | Blaine et al. |
| 2013/0262956 | A1 | 10/2013 | Haywood et al. |
| 2014/0181359 | A1 | 6/2014 | Zhang et al. |
| 2015/0178142 | A1 * | 6/2015 | Raj ..................... G06F 11/0766 714/49 |
| 2016/0062885 | A1 * | 3/2016 | Ryu .................... G06F 12/0253 711/103 |
| 2016/0085796 | A1 * | 3/2016 | Ki ........................... G06F 16/13 707/695 |
| 2016/0191815 | A1 | 6/2016 | Annau et al. |
| 2016/0342317 | A1 | 11/2016 | Lim et al. |
| 2017/0004063 | A1 | 1/2017 | Broderick et al. |
| 2017/0031615 | A1 | 2/2017 | Lee |
| 2017/0047124 | A1 | 2/2017 | Ellis et al. |
| 2019/0004895 | A1 | 1/2019 | Lee |
| 2019/0114218 | A1 | 4/2019 | Yun et al. |
| 2019/0179694 | A1 | 6/2019 | Park |
| 2020/0100440 | A1 * | 4/2020 | Micu ..................... G05B 19/042 |
| 2020/0151056 | A1 * | 5/2020 | Chen .................. G06F 11/1068 |
| 2020/0174865 | A1 | 6/2020 | Kim |
| 2021/0200619 | A1 | 7/2021 | Liang et al. |
| 2021/0200620 | A1 | 7/2021 | Sassara et al. |
| 2022/0138038 | A1 | 5/2022 | Liang et al. |

FOREIGN PATENT DOCUMENTS

| | | | |
|---|---|---|---|
| CN | 102982848 | | 3/2013 |
| CN | 103744775 | | 4/2014 |
| CN | 109634873 | | 4/2019 |
| CN | 109947596 | | 6/2019 |
| CN | 113127243 | A | 7/2021 |
| CN | 113127244 | A | 7/2021 |
| CN | 113127244 | B | 1/2023 |
| JP | 2010204851 | A * | 9/2010 |
| TW | 201518947 | A * | 5/2015 ............. G06F 13/28 |

OTHER PUBLICATIONS

"Chinese Application Serial No. 202011577493.7, Office Action dated Jun. 21, 2022", with English translation, 23 pages.

Gao, Jiandang, "Electronic Circuit Debugging and Simulation p. 98", Yunnan University Press w English Translation, (Jun. 30, 2016), 7 pgs.

Zhang, Youde, "The Principle, Application and Experiment of Single Chip Microcomputer p. 28", Fudan University Press, A51 Edition w English Translation, (Mar. 31, 2013), 4 pgs.

"Chinese Application Serial No. 202011577493.7, Response filed Feb. 26, 2021 to Notification to Make Rectification dated Feb. 10, 2021", w/English Claims, 114 pgs.

"Chinese Application Serial No. 202011577493.7, Office Action dated Oct. 17, 2022", with machine English translation, 21 pages.

"Chinese Application Serial No. 202011577493.7, Response filed Sep. 13, 2022 to Office Action dated Jun. 21, 2022", with English claims, 15 pages.

"Chinese Application Serial No. 202011588945.1, Response filed Aug. 23, 2022 to Office Action dated May 31, 2022", with English claims, 12 pages.

U.S. Appl. No. 16/989,274, filed Aug. 10, 2020, Real-Time Trigger to Dump an Error Log.

U.S. Appl. No. 17/575,252, filed Jan. 13, 2022, Real-Time Trigger to Dump an Error Log.

U.S. Appl. No. 16/989,316, filed Aug. 10, 2020, Real-Time Trigger to Dump an Error Log.

"Chinese Application Serial No. 202011577493.7, Notification to Make Rectification dated Feb. 10, 2021", with machine English translation, 2 pages.

* cited by examiner

REAL-TIME TRIGGER TO DUMP AN ERROR LOG

PRIORITY APPLICATION

This application is a continuation of U.S. application Ser. No. 16/989,316, filed Aug. 10, 2020, which claims the benefit of priority to U.S. Provisional Application Ser. No. 62/955,280 filed 30 Dec. 2019, all of which are incorporated herein by reference in their entirety.

FIELD OF THE DISCLOSURE

Embodiments of the disclosure relate generally to memory systems and systems that interact with memory systems, and more specifically, to management of error logs associated with memory systems.

BACKGROUND

Memory devices are typically provided as internal, semiconductor, integrated circuits in computers or other electronic devices. There are many different types of memory, including volatile and non-volatile memory. Volatile memory requires power to maintain its data, and includes random-access memory (RAM), dynamic random-access memory (DRAM), or synchronous dynamic random-access memory (SDRAM), among others. Non-volatile memory can retain stored data when not powered, and includes flash memory, read-only memory (ROM), electrically erasable programmable ROM (EEPROM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others.

Flash memory is utilized as non-volatile memory for a wide range of electronic applications. Flash memory devices typically include one or more groups of one-transistor, floating gate, or charge trap memory cells that allow for high memory densities, high reliability, and low power consumption. Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

BRIEF DESCRIPTION OF THE DRAWINGS

The drawings, which are not necessarily drawn to scale, illustrate generally, by way of example, but not by way of limitation, various embodiments discussed in the present document.

DETAILED DESCRIPTION

Figure 1:
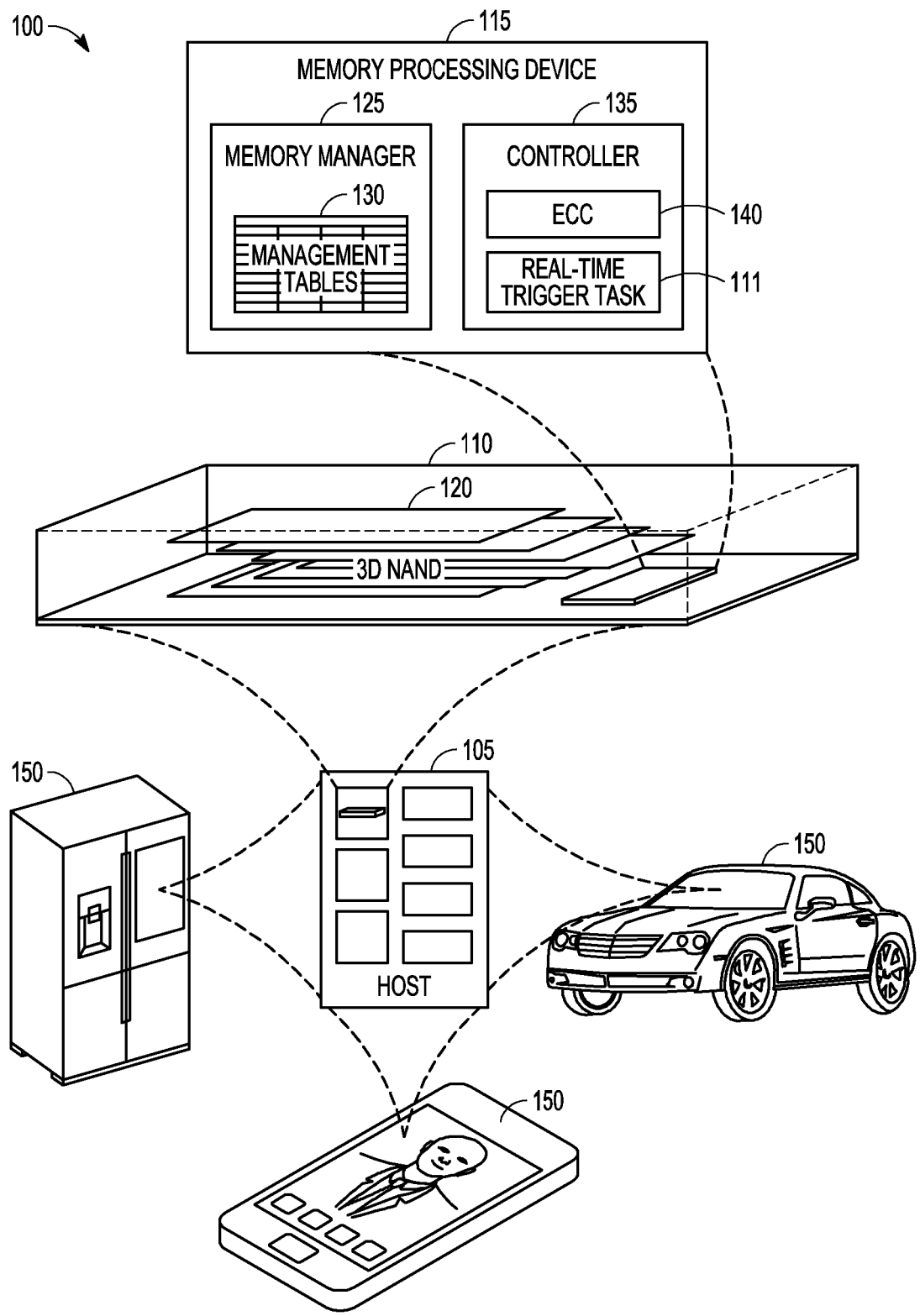
FIG. 1 illustrates an example of an environment including a memory device, according to various embodiments.

The following detailed description refers to the accompanying drawings that show, by way of illustration, various embodiments that can be implemented. These embodiments are described in sufficient detail to enable those of ordinary skill in the art to practice these and other embodiments. Other embodiments may be utilized, and structural, logical, mechanical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

After a product, such as a memory device, is provided to a consumer in a particular field of use, there can be continued debugging of the product. During the product field debugging, it is difficult to capture all critical information at the time that an issue occurs. This difficulty can be associated with a real time synchronization mechanism between a host and the memory device. Due to such synchronization difficulties, one may not rely on duplication of issues, which can have low efficiency, be time-consuming, and, sometimes, even extremely difficult to reproduce.

For example, when a link between a host and a memory device is lost, it is impossible for the host to immediately notify the device via a command about the error happening, since the protocol link is broken. For a Universal Flash Storage (UFS™) device, there can be a MPHY/UniPro Error. UniPro (Unified Protocol) is a relatively high-speed interface technology for interconnecting integrated circuits in mobile electronics and electronics having components with mobile-related characteristics and mobile-influenced electronics. M-PHY (MPHY) is a high speed data communications physical layer standard developed by the MIPI Alliance, which is a global, open membership organization that develops interface specifications for the mobile electronics environment. The UFS electrical interface at the UFS interconnect layer in a layered communications architecture can handle connection between the UFS host and the UFS device, where the M-PHY specification with the UniPro specification forms the basis for the interconnect of the UFS interface. UniPro can be used to monitor the bit error rate of a link by communicating with the M-PHY physical layer. UniPro is a transport protocol that also keeps track of retries with procedures on how to retry it or resend it. Since the UFS device awaits instructions for the UFS host, lost of a link is not immediately correlated to a lack of receiving a signal from the UFS host. With the link lost, the host cannot immediately notify the device via a command about the error happening.

An error condition can occur with a timeout failure. When a host detects a command timeout, the device, which is interfacing with the host, may be busy on task processing. The task processing can be executing instructions stored in firmware of the device such that it does not process a notification of an error condition in near time. The notification of the error condition may be queued with respect to the task processing. The firmware based processing may even be hung in a stuck condition such that it misses any upcoming host protocol signal. Additionally, it either case, the device may lose the opportunity to update its error log.

An error condition can occur in which a host triggers a reset signal to the device to which it is interfacing. The reset signal is a signal to force the device to recover from an error state. However, this signal can be several seconds after the failure event happens. The device may lose the opportunity to update its error log.

A number of current failure analysis techniques are based on code injection or specific vendor commands. These approaches imply status alteration of the device. These approaches tend to perform a re-test with dedicated test firmware.

In various embodiments, a real-time trigger can be generated from a host to a device, which can be used to notify the device to timely capture all needed information in the device's error log and dump the error log to save the information for later failure analysis. Dumping is a save operation. The dumping can be implemented by saving to a dedicated non-volatile memory that is allotted as specific memory for the error log of the device. The dedicated non-volatile memory can be a portion of memory of the device that stores user data or a portion of a static random access memory (SRAM) or a ROM. Real-time trigger techniques can allow improvement of failure analysis capability during both internal manufacturer qualifying stage and host customer platform issues, such the real-time trigger can be conducted in a manner that is not device-intrusive. Such techniques can include the use of customized commands sequence or external trigger that use interfaces to the memory such as a universal asynchronous receiver/transmitter (UART) or a general purpose input/output (GPIO).

An interface of an apparatus is a mechanism by which interaction or communication is achieved between the apparatus and another apparatus. The interface can include a number of connections to couple with the other apparatus according to protocols for the connections defined for the apparatus. For a memory device, an interface can include various buses, input connections for signals to the memory device, output connections for signals from the memory device, protocols, and other structures to communicate to and from the memory device, according to the design of the memory device and protocols under which the memory device operates with respect to specifications associated with the memory device. A memory device can include interfaces between the components of the memory device. An interface can be a hardware interface, an instruction-based interface, or a combination of hardware and instruction-based interface.

A UART is a hardware device for asynchronous serial communication in which the data format and transmission speeds are configurable. For example, a UART can perform serial-to-parallel conversions on data received from a peripheral device and parallel-to-serial conversion on data received from a processor. The UART can include control capability and a processor interrupt system that can be tailored to minimize software management of the communications link. A GPIO is a type of pin found on an integrated circuit or electronic circuit board that does not have a specific function. The behavior of this pin, including whether it acts as input or output, is controllable by at run time. A group of GPIO pins can be arranged as a GPIO port.

With the real-time trigger techniques taught herein, a host can cause a device to dump relevant device information in case of an error condition. The relevant device information can include both hardware and firmware information. Such information can include data timeout, data mismatch, fatal error, initialization timeout, and identification of stuck device firmware.

A real-time trigger can be signaled to firmware of the memory device through a hardware interrupt handled by an interrupt service routine (ISR). The ISR of the real-time trigger can invoke or resume a dedicated task, which is a real-time trigger task, in charge of dumping the device system status that can be in the form of an error log. The real-time trigger task can be independent from firmware task status associated with conventional memory device tasks.

In various embodiments, a memory device can comprise an interface to receive a signal at the memory device that can cause the memory device to dump an error log of the memory device to a memory component of the memory device. The memory device can include a number of data storage memories, one or more processes, and other components to manage the memory device and access to data stored in the memory device. The memory device can have a number of interfaces with devices external to the memory device such as host devices. An interface can include a number of pins with the pins arranged for different functions, for example, data transfer, associated data addresses, a UART, a GPIO, a reset, or other functions. The one or more processors of the memory device can execute instructions stored on one or more components in the memory device. When the instructions are executed by the one or more processors, the memory device can perform operations correlated to the instructions. The operations can include dumping an error log to a memory component of the memory device, in response to identifying, from a signal received at the interface, a trigger to dump the error log.

The interface of the memory device can be structured to receive the signal to dump the error log of the memory device to the memory component of the memory device in a number of ways, depending on the protocol specification of the memory device. The interface of the memory device can include a GPIO to receive the signal to the memory device to dump the error log of the memory device to a memory component of the memory device. The interface of the memory device can include a UART to receive the signal. The memory device can include a GPIO and a UART with the memory device arranged to select one of the GPIO and the UART to receive the signal to the memory device to dump the error log of the memory device to a memory component of the memory device. The interface can be structured to receive the signal as a command to dump the error log to the memory component of the memory device. In one device protocol specification, the command can be an embedded Multi-Media Controller (eMMC) command for real-time trigger task activation. In another device protocol specification, the command can be a Universal Flash Storage (UFS) query request with a UFS protocol information unit (UPIU) for enabling real-time trigger task activation.

Instructions in the memory device to dump the error log can be stored in a portion of the memory device, where the portion is separate from firmware that controls data management for the memory device for data storage. The error log can include hardware information and firmware information. The error log can include one or more of a data timeout, a data mismatch, a fatal error, an initialization timeout, and an identification of stuck firmware of the memory device.

In response to identifying, from the signal received at the interface, a trigger to dump the error log, the memory device can complete on-going tasks and save cached host data in addition to dumping the error log of the memory device to the memory component of the memory device. These actions, in addition to dumping its error log, can be conducted by the memory device in anticipation of a shut-down of the memory device. Instructions defining actions to be taken by the memory device in response to receiving and identifying the trigger signal can be stored in a dedicated portion of the memory device. The dedicated portion can be separate from firmware that controls data management for data storage in the memory device. The dedicated portion of the memory device can be a portion of a static random access memory or a read only memory.

The error log, which is dumped to memory of the memory device in response to receiving the trigger signal, can include hardware information and firmware information. For example, the error log can include one or more of a data timeout, a data mismatch, a fatal error, an initialization timeout, and an identification of stuck firmware of the memory device. At some time after the error log is dumped to memory of the memory device, a failure analysis can be conducted with respect to the triggered dump. To perform such failure analysis, the error log, dumped to the memory of the memory device, can be transmitted from the memory component to a host.

A system, such as a host, to interface with a memory device, can comprise components to detect one or more error conditions associated with the data storage device. Upon detection of the one or more error conditions, a trigger signal can be generated depending on the protocol specification of the memory device. The system, to interface with a memory device, can include a processor configured to execute instructions stored on one or more components in the system. The instructions, when executed by the processor, can cause the system to perform operations. The operations can include detecting an error condition associated with the memory device and transmitting, in response to the detection of the error condition, a signal to the memory device to trigger a dump of an error log in the memory device.

The system to interface with a memory device can transmit the signal to the memory device to trigger the dump of the error log in the memory device in a number of ways. Transmission of the signal to the memory device can include transmitting the signal to a GPIO of the memory device or to a UART of the memory device. The processor of the system, to interface with a memory device, can be arranged to generate, in the signal to the memory device, a command to dump the error log to the memory component of the memory device. The command can be an eMMC command for real-time trigger task activation. In another embodiment, the command can be a UFS query request with a UPIU for enabling real-time trigger task activation.

The operations executed by the processor of the system can include receiving the error log, which was dumped to the memory component of the memory device, from the memory device. The error log can be retrieved by the system to conduct failure analysis using the received error log. The system can perform the failure analysis or provide the information of the error log to another device, which can be remotely located from the system that receives the information from the memory.

A host and an associated memory device, using eMMC protocols, can utilize a customized eMMC command or a sequence of eMMC customized commands in implementing a real-time technique to trigger an error log dump or other error condition based dump to a memory component of the UFS memory device. An application-specific command, CMD55, followed by an application specific-command, ACMDxx, can be implemented. CMD 55 can be used to enable failure analysis modality. In an eMMC device, a CMD55 command followed by an application specific-command, ACMD, is interpreted by the receiving eMMC device as an instruction to execute the operations corresponding to the ACMD. To trigger the error log dump to a memory component of the eMMC device, ACMDxx can be provided with xx identifying real-time trigger task activation is to be conducted. For example, an eMMC memory device upon receiving a CMD55 from the host can signal the host that an ACMD is now expected by the eMMC memory device. In response, the host can send the ACMDxx to trigger the error log dump task with the eMMC memory device acknowledging receipt of ACMDxx. The eMMC memory device can then commence the error log dump and take other actions associated with the error log dump. These actions can include actions to take in anticipation of a shut-down of the memory device such as, but not limited to, completing on-going tasks and saving cached host data.

For a UFS device, information transfer, which is a communication, between a host and the UFS device is performed through UPIU messages. These messages are UFS defined data structures that contain a number of sequentially addressed bytes arranged as various information fields. For example, command structures consist of command descriptor blocks (CDB) that contain a command opcode and related parameters, flags and attributes. The command transaction originates in an initiator device and is sent to a logical unit within a target device. For enumeration and configuration, UFS based apparatus support a system of descriptors, attributes and flags that define and control the specifics of the device, including operating characteristics, interfaces, number of logical units, operating speeds, power profiles, etc. The system is a hierarchical tree of related elements.

Queries are used to read and write data structures between the host and the UFS device. This data is different from normal device reads or writes in that the data is considered system data, configuration data, production information, descriptors, special parameters and flags and other. For UFS apparatus, the query function will generally be used to read or write descriptors, attributes and flags. There are also a range of vendor specific operations that can be used to transfer vendor specific data between the host and the UFS device. These items can reside within the UFS device memory and used by the UFS device to control or define its operation.

A descriptor is a block or page of parameters that describe something about the UFS device that is the subject of the descriptor. A descriptor is a data structure with a defined format. There are a number of descriptors, for example, a device descriptor, a configuration descriptor, a unit descriptor, and other descriptors. An attribute is a single parameter that represents a specific range of numeric values that can be set or read. This value can be represented as a byte or word or floating point number. Attribute size can range from 1-bit to a higher number of bits such as a 32-bit size. Attributes of the same type can be organized in arrays, where each element of the attribute array can be identified by an index. A flag is a single Boolean value that represents a true or false, '0' or '1', on or off type of value. A flag can be cleared or reset, set, toggled or read. Flags are useful to enable or disable certain functions or modes or states within the device.

A host and an associated UFS memory device can utilize UFS protocols in implementing a real-time technique to trigger an error log dump or other error condition based dump to a memory component of the UFS memory device. A customized UFS command or a sequence of UFS customized commands can be implemented. A query request UPIU can be used with an application opcode defined that enables a failure analysis modality and a real-time trigger task activation in the UFS memory device. The UFS memory device can then commence the error log dump and take other actions associated with the error log dump. These actions can include actions to take in anticipation of a shut-down of the memory device such as, but not limited to, completing on-going tasks and saving cached host data.

A GPIO signal from a host to a memory device to trigger an error log dump or other error condition based dump to a memory component of a memory device can be implemented with respect to both eMMC protocols and UFS protocols. Similar approaches using a GPIO signal can be adapted for operation of a host and an associated memory device under other protocols such as, but not limited to, proprietary protocols. A UART interrupt signal from a host to a memory device to trigger an error log dump or other error condition based dump to a memory component of a memory device can be implemented with respect to both eMMC protocols and UFS protocols. Similar approaches using a UART interrupt can be adapted for operation of a host and an associated memory device under other protocols such as, but not limited to, proprietary protocols.

Memory devices can include individual memory die, which may, for example, include a storage region comprising one or more arrays of memory cells, implementing one (or more) selected storage technologies. Such memory die will often include support circuitry for operating the memory array(s). Other examples, sometimes known generally as "managed memory devices," include assemblies of one or more memory die associated with controller functionality configured to control operation of the one or more memory die. Such controller functionality can simplify interoperability with an external device, such as a host. In such managed memory devices the controller functionality may be implemented on one or more die also incorporating a memory array, or on a separate die. In other examples, one or more memory devices may be combined with controller functionality to form a solid-stage drive (SSD) storage volume.

Embodiments of the present disclosure can include examples of managed memory devices implementing NAND flash memory cells, termed "managed NAND" devices. These examples, however, are not limiting on the scope of the disclosure, which may be implemented in other forms of memory devices and/or with other forms of storage technology.

Both NOR and NAND flash architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0) representing one bit of data. Flash memory cells can also represent more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to refer to any memory cell(s) that can store more than one bit of data per cell (i.e., that can represent more than two programmed states).

Managed memory devices may be configured and operated in accordance with recognized industry standards. For example, managed NAND devices may be (as non-limiting examples), a UFS device, or an embedded MMC device (eMMC™), etc. For example, in the case of the above examples, UFS devices may be configured in accordance with Joint Electron Device Engineering Council (JEDEC) standards (e.g., JEDEC standard JESD223D, entitled "JEDEC UFS Flash Storage 3.0," and/or updates or subsequent versions to such standard). Similarly, identified eMMC devices may be configured in accordance with JEDEC standard JESD84-A51, entitled "JEDEC eMMC standard 5.1" and/or updates or subsequent versions to such standard.

An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells, to obviate internal battery supply requirements, thus allowing the drive to be more versatile and compact. Managed NAND devices can be used as primary or ancillary memory in various forms of electronic devices, and are commonly used in mobile devices.

Both SSDs and managed memory devices can include a number of memory devices, including a number of dies or logical units (e.g., logical unit numbers or LUNs), and can include one or more processors or other controllers performing logic functions required to operate the memory devices or interface with external systems. Such SSDs and managed memory devices can include one or more flash memory die, including a number of memory arrays and peripheral circuitry thereon. The flash memory arrays can include a number of blocks of memory cells organized into a number of physical pages. In some examples, the SSDs can also include DRAM or SRAM (or other forms of memory die or other memory structures). Similarly, managed NAND devices can include one or more arrays of volatile and/or nonvolatile memory separate from the NAND storage array, and either within or separate from a controller. Both SSDs and managed NAND devices can receive commands from a host in association with memory operations, such as read or write operations, to transfer data (e.g., user data and associated integrity data, such as error data and address data, etc.) between the memory devices and the host, or erase operations to erase data from the memory devices.

Electronic devices, such as mobile electronic devices (e.g., smart phones, tablets, etc.), electronic devices for use in automotive applications (e.g., automotive sensors, control units, driver-assistance systems, passenger safety or comfort systems, etc.), and internet-connected appliances or devices (e.g., Internet-of-Things (IoT) devices, etc.), have varying storage needs depending on, among other things, the type of electronic device, use environment, performance expectations, etc.

Electronic devices can be broken down into several main components: a processor (e.g., a central processing unit (CPU) or other main processor); memory (e.g., one or more volatile or non-volatile RAM memory devices, such as DRAM, mobile or low-power double-data-rate synchronous DRAM (DDR SDRAM), etc.); and a storage device (e.g., non-volatile memory (NVM) device, such as flash memory, ROM, an SSD, an MMC, or other memory card structure or assembly, etc.). In certain examples, electronic devices can include a user interface (e.g., a display, touch-screen, keyboard, one or more buttons, etc.), a graphics processing unit (GPU), a power management circuit, a baseband processor or one or more transceiver circuits, etc.

FIG. 1 illustrates an example of an environment 100 including a host device 105 and a memory device 110 configured to communicate over a communication interface. The host device 105 or the memory device 110 may be included in a variety of products 150, such as IoT devices (e.g., a refrigerator or other appliance, sensor, motor or actuator, mobile communication device, automobile, drone, etc.) to support processing, communications, or control of the product 150.

The memory device 110 includes a memory processing device 115 and a memory array 120 including, for example, a number of individual memory die (e.g., a stack of 3D NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105.

One or more communication interfaces can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a UFS interface, an eMMC™ interface, or one or more other connectors or interfaces. The host device 105 can include a host system, an electronic device, a processor, a memory card reader, or one or more other electronic devices external to the memory device 110. In some examples, the host device 105 may be a machine having some portion, or all, of the components discussed in reference to the machine 500 of FIG. 5.

The memory processing device 115 can receive instructions from the host device 105, and can communicate with the memory array 120, such as to transfer data to (e.g., write or erase) or from (e.g., read) one or more of the memory cells, planes, sub-blocks, blocks, or pages of the memory array 120. The memory processing device 115 can include, among other things, circuitry or firmware, including one or more components or integrated circuits. For example, the memory processing device 115 can include one or more memory control units, circuits, or components configured to control access across the memory array 120 and to provide a translation layer between the host device 105 and the memory device 110. The memory processing device 115 can include one or more input/output (I/O) circuits, lines, or interfaces to transfer data to or from the memory array 120. The memory processing device 115 can include a memory manager 125 and an array controller 135.

The memory manager 125 can include, among other things, circuitry or firmware, such as a number of components or integrated circuits associated with various memory management functions. In some embodiments, the functions of the memory manager 125 are implemented by a controller (or processor) executing the instructions of firmware. For example, memory manager 125 can, in some examples, be implemented at least in part by one or more processors, for example as may be found within processing device 615 of FIG. 6, which may execute instructions stored in memory, for example, in management memory 616 or data storage 612. The management tables 130 can be similarly be stored on the memory processing device 115, in either of such memory device locations. In other examples, the instructions and/or management tables 130 may be stored in certain blocks of the NAND die stack 120 and loaded into the working memory of memory processing device 115 during operation.

Figure 6:
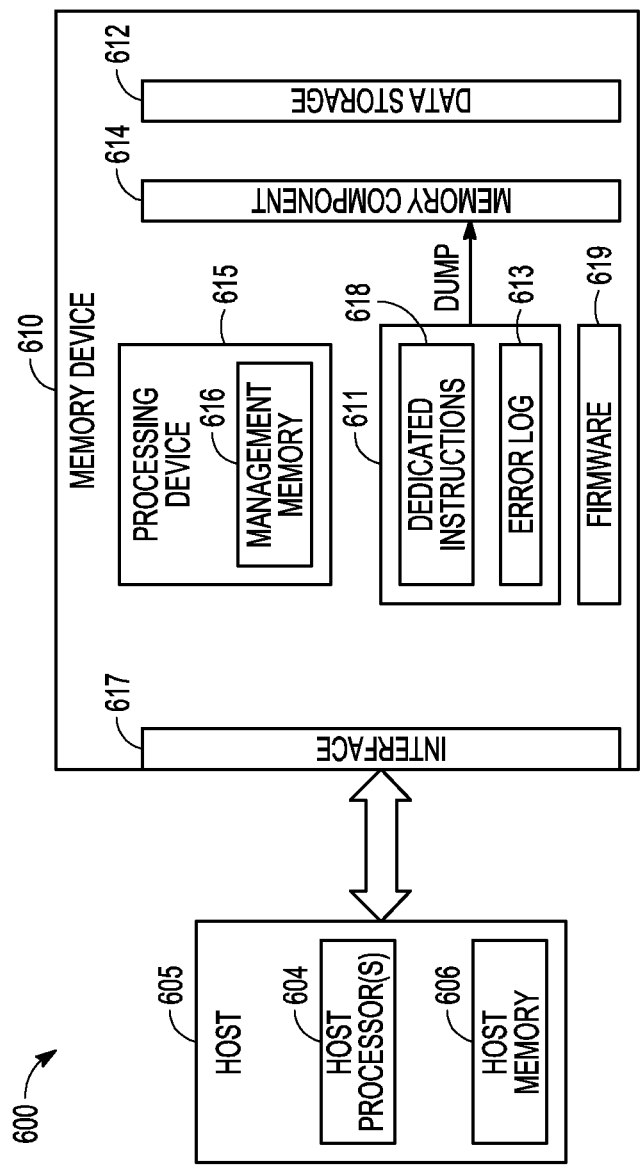
FIG. 6 is a block diagram of an example system including a host that operates with a memory device in which the host can detect one or more error conditions associated with the memory device and transmit, in response to the detection of the one or more error conditions, a trigger signal to the memory device to trigger a dump of an error log in the memory device, according to various embodiments.

Those skilled in the art will recognize that, in some examples, the components and functions of memory manager 125 and array controller 135 can be implemented by any combination of components (or subsets thereof) described herein, such as processing device 615 and data storage 612 of FIG. 6; and may include additional hardware components.

For purposes of the present description, example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.) or generate device commands (e.g., to accomplish various memory management functions) for the array controller 135 or one or more other components of the memory device 110.

The memory manager 125 can include a set of management tables 130 configured to maintain various information associated with one or more components of the memory device 110 (e.g., various information associated with a memory array or one or more memory cells coupled to the memory processing device 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory processing device 115. In certain examples, if the number of detected errors for one or more of the error counts is above a threshold, the bit error can be referred to as an uncorrectable bit error. The management tables 130 can maintain a count of correctable or uncorrectable bit errors, among other things.

The array controller 135 can include, among other things, circuitry or components configured to control memory operations associated with writing data to, reading data from, or erasing one or more memory cells of the memory device 110 coupled to the memory processing device 115. The memory operations can be based on, for example, host commands received from the host device 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory processing device 115. The array controller 135 can include a real-time trigger task component 111 that can include instructions for dumping an error log of the memory device 110 to a memory component of the the memory device 110 in response to detecting reception of a trigger signal to execute the dumping. The memory processing device 115 can be configured to actively detect and recover from error occurrences (e.g., bit errors, operation errors, etc.) associated with various operations or storage of data, while maintaining integrity of the data transferred between the host device 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

The memory array 120 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode or in a desired MLC mode (such as TLC, QLC, etc.).

In operation, data is typically written to or read from the NAND memory device 110 in pages and erased in blocks. However, one or more memory operations (e.g., read, write, erase, etc.) can be performed on larger or smaller groups of memory cells, as desired. The data transfer size of a NAND memory device 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a MLC NAND flash device may have a higher bit error rate than a corresponding SLC NAND flash device. As such, the MLC device may require more metadata bytes for error data than the corresponding SLC device.

Figure 2:
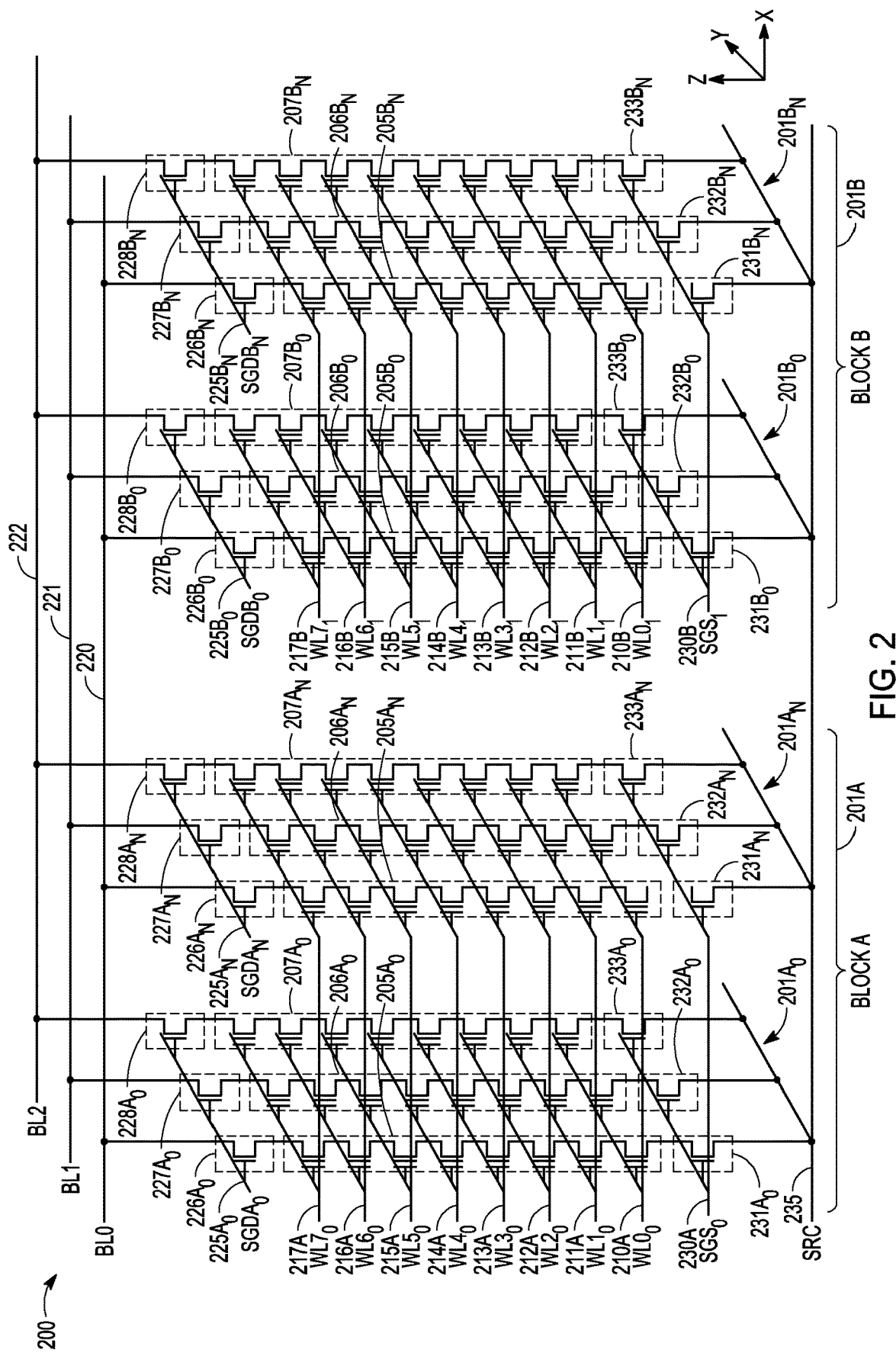
FIGS. 2 and 3 illustrate schematic diagrams of an example of a three-dimensional NAND architecture semiconductor memory array, according to various embodiments.

FIG. 2 illustrates an example schematic diagram of a 3D NAND architecture semiconductor memory array 200 that can be implemented as memory array 120 of FIG. 1. The 3D NAND architecture semiconductor memory array 200 can include a number of strings of memory cells (e.g., first-third $A_0$ memory strings $205A_0$-$207A_0$, first-third $A_n$ memory strings $205A_n$-$207A_n$, first-third $B_0$ memory strings $205B_0$-$207B_0$, first-third $B_n$ memory strings $205B_n$-$207B_n$, etc.), organized in blocks (e.g., block A 201A, block B 201B, etc.) and sub-blocks (e.g., sub-block $A_0$ $201A_0$, sub-block $A_n$ $201A_n$, sub-block $B_0$ $201B_0$, sub-block $B_n$ $201B_n$, etc.). The memory array 200 represents a portion of a greater number of similar structures that would typically be found in a block, device, or other unit of a memory device.

Each string of memory cells includes a number of tiers of charge storage transistors (e.g., floating gate transistors, charge-trapping structures, etc.) stacked in the Z direction, source to drain, between a source line (SRC) 235 or a source-side select gate (SGS) (e.g., first-third $A_0$ SGS $231A_0$-$233A_0$, first-third $A_n$ SGS $231A_n$-$233A_n$, first-third $B_0$ SGS $231B_0$-$233B_0$, first-third $B_n$ SGS $231B_n$-$233B_n$, etc.) and a drain-side select gate (SGD) (e.g., first-third $A_0$ SGD $226A_0$-$228A_0$, first-third $A_n$ SGD $226A_n$-$228A_n$, first-third $B_0$ SGD $226B_0$-$228B_0$, first-third $B_n$ SGD $226B_n$-$228B_n$, etc.). Each string of memory cells in the 3D memory array can be arranged along the X direction as data lines (e.g., bit lines (BL) BL0-BL2 220-222) and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, with each block having two sub-blocks, each sub-block having a single physical page, each physical page having three strings of memory cells, and each string having 8 tiers of memory cells, in other examples, the memory array 200 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the charge storage transistors (e.g., select gates, data lines, etc.), as desired. As an example, a 48 GB TLC NAND memory device can include 18,592 bytes (B) of data per page (16,384+2208 bytes), 1536 pages per block, 548 blocks per plane, and 4 or more planes per device.

Each memory cell in the memory array 200 includes a control gate (CG) coupled to (e.g., electrically or otherwise operatively connected to) an access line (e.g., word lines (WL) $WL0_0$-$WL7_0$ 210A-217A, $WL0_1$-$WL7_1$ 210B-217B, etc.), which collectively couples the control gates (CGs) across a specific tier, or a portion of a tier, as desired. Specific tiers in the 3D memory array 200, and accordingly, specific memory cells in a string, can be accessed or controlled using respective access lines. Groups of select gates can be accessed using various select lines. For example, first-third $A_0$ SGD $226A_0$-$228A_0$ can be accessed using an $A_0$ SGD line $SGDA_0$ $225A_0$, first-third $A_n$ SGD $226A_n$-$228A_n$ can be accessed using an $A_n$ SGD line $SGDA_n$ $225A_n$, first-third $B_0$ SGD $226B_0$-$228B_0$ can be accessed using an $B_0$ SGD line $SGDB_0$ $225B_0$, and first-third $B_n$ SGD $226B_n$-$228B_n$ can be accessed using an $B_n$ SGD line $SGDB_n$ $225B_n$. First-third $A_0$ SGS $231A_0$-$233A_0$ and first-third $A_n$ SGS $231A_n$-$233A_n$ can be accessed using a gate select line $SGS_0$ 230A, and first-third $B_0$ SGS $231B_0$-$233B_0$ and first-third $B_n$ SGS $231B_n$-$233B_n$ can be accessed using a gate select line $SGS_1$ 230B.

In an example, the memory array 200 can include a number of levels of semiconductor material (e.g., polysilicon, etc.) configured to couple the CGs of each memory cell or select gate (or a portion of the CGs or select gates) of a respective tier of the array 200. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

Figure 3:
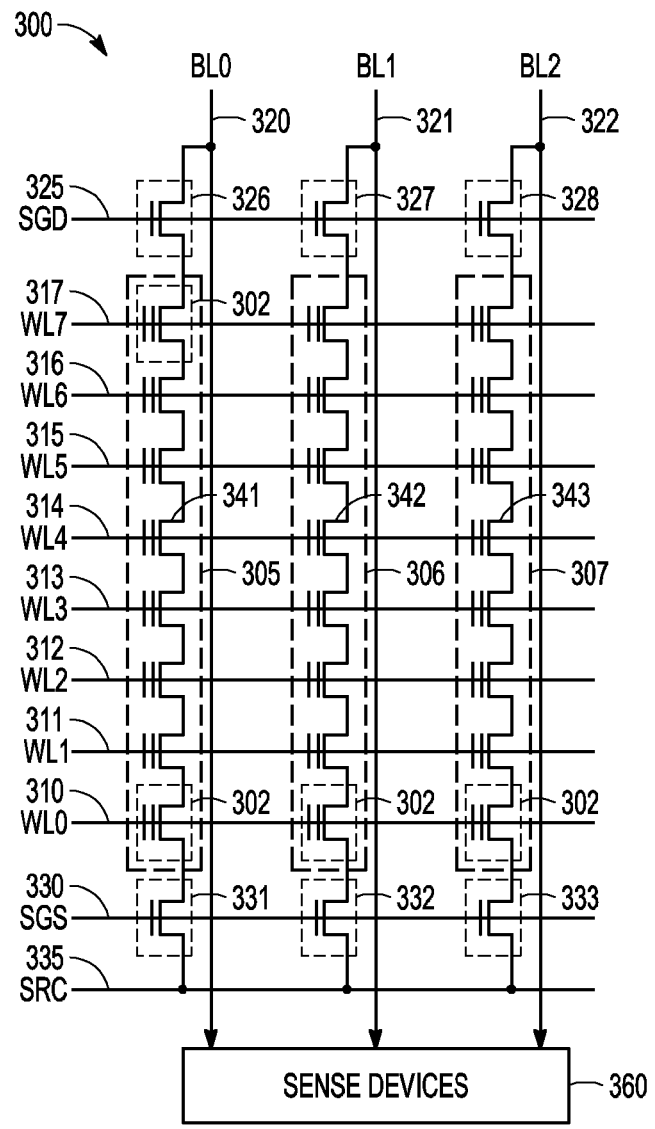

FIG. 3 illustrates an example schematic diagram of a portion of a NAND architecture semiconductor memory array 300 that can be implemented as memory array 120 of FIG. 1. The portion of the NAND architecture semiconductor memory array 300 can include a plurality of memory cells 302 arranged in a two-dimensional (2D) array of strings (e.g., first-third strings 305-307) and tiers (e.g., illustrated as respective word lines (WL) WL0-WL7 310-317, a drain-side select gate (SGD) line 325, a source-side select gate (SGS) line 330, etc.), and sense amplifiers or devices 360. For example, the memory array 300 can illustrate an example schematic diagram of a portion of one physical page of memory cells of a 3D NAND architecture semiconductor memory device, such as illustrated in FIG. 2.

Each string of memory cells is coupled to a source line (SRC) 335 using a respective source-side select gate (SGS) (e.g., first-third SGS 331-333), and to a respective data line (e.g., first-third bit lines (BL) BL0-BL2 320-322) using a respective drain-side select gate (SGD) (e.g., first-third SGD 326-328). Although illustrated with 8 tiers (e.g., using word lines (WL) WL0-WL7 310-317) and three data lines (BL0-BL2 326-328) in the example of FIG. 3, other examples can include strings of memory cells having more or fewer tiers or data lines, as desired.

In a NAND architecture semiconductor memory array, such as the example memory array 300, the state of a selected memory cell 302 can be accessed by sensing a current or voltage variation associated with a particular data line containing the selected memory cell. The memory array 300 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., WL4), and thus, to a control gate of each memory cell coupled to the selected word lines (e.g., first-third CGs 341-343 of the memory cells coupled to WL4). Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as WL4, a pass voltage of 10V can be applied to one or more other word lines, such as WL3, WL5, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to WL4, a pass voltage of 10V can be applied to WL3 and WL5, a pass voltage of 8V can be applied to WL2 and WL6, a pass voltage of 7V can be applied to WL1 and WL7, etc. In other examples, the pass voltages, or number of word lines, etc., can be higher or lower, or more or less.

The sense amplifiers 360, coupled to one or more of the data lines (e.g., first, second, or third bit lines (BL0-BL2) 320-322), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or FN tunneling, etc.) from the floating gates of the targeted memory cells to the channels.

Figure 4:
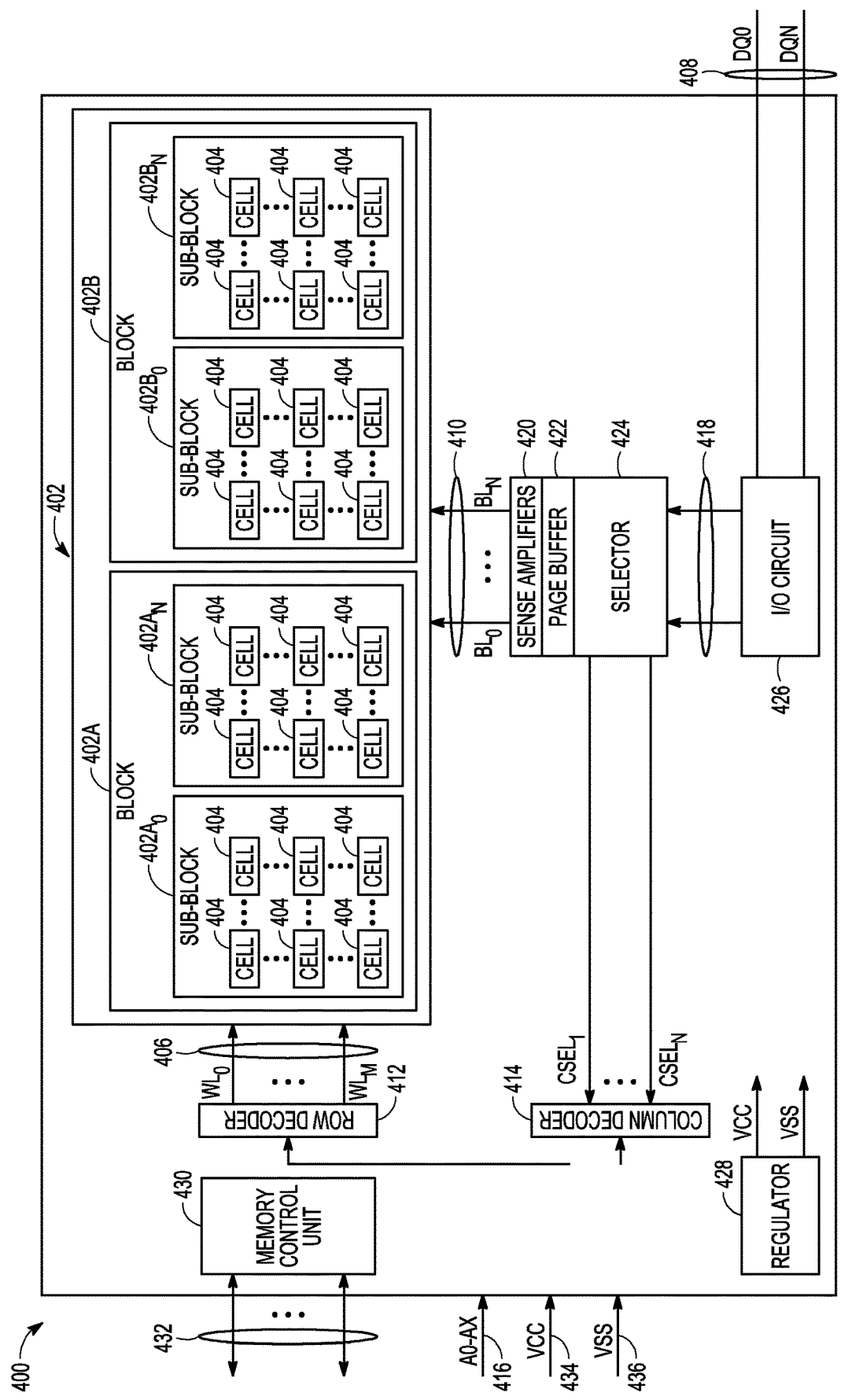
FIG. 4 illustrates an example block diagram of a memory module, according to various embodiments.

FIG. 4 illustrates an example block diagram of a memory device 400, which can be implemented in memory device 110 of FIG. 1, including a memory array 402 having a plurality of memory cells 404, and one or more circuits or components to provide communication with, or perform one or more memory operations on, the memory array 402. The memory device 400 can include a row decoder 412, a column decoder 414, sense amplifiers 420, a page buffer 422, a selector 424, an I/O circuit 426, and a memory control unit 430.

The memory cells 404 of the memory array 402 can be arranged in blocks, such as first and second blocks 402A, 402B. Each block can include sub-blocks. For example, the first block 402A can include first and second sub-blocks $402A_0$, $402A_n$, and the second block 402B can include first and second sub-blocks $402B_0$, $402B_n$. Each sub-block can include a number of physical pages, with each page including a number of memory cells 404. Although illustrated herein as having two blocks, with each block having two sub-blocks, and each sub-block having a number of memory cells 404, in other examples, the memory array 402 can include more or fewer blocks, sub-blocks, memory cells, etc. In other examples, the memory cells 404 can be arranged in a number of rows, columns, pages, sub-blocks, blocks, etc., and accessed using, for example, access lines 406, first data lines 410, or one or more select gates, source lines, etc.

The memory control unit 430 can control memory operations of the memory device 400 according to one or more signals or instructions received on control lines 432, including, for example, one or more clock signals or control signals that indicate a desired operation (e.g., write, read, erase, etc.), or address signals (A0-AX) received on one or more address lines 416. One or more devices external to the memory device 400 can control the values of the control signals on the control lines 432 or the address signals on the address line 416. Examples of devices external to the memory device 400 can include, but are not limited to, a host, a memory controller, a processor, or one or more circuits or components not illustrated in FIG. 4.

The memory device 400 can use access lines 406 and first data lines 410 to transfer data to (e.g., write or erase) or from (e.g., read) one or more of the memory cells 404. The row decoder 412 and the column decoder 414 can receive and decode the address signals (A0-AX) from the address line 416, can determine which of the memory cells 404 are to be accessed, and can provide signals to one or more of the access lines 406 (e.g., one or more of a plurality of word lines (WL0-WLm)) or the first data lines 410 (e.g., one or more of a plurality of bit lines (BL0-BLn)), such as described above.

The memory device 400 can include sense circuitry, such as the sense amplifiers 420, configured to determine the values of data on (e.g., read), or to determine the values of data to be written to, the memory cells 404 using the first data lines 410. For example, in a selected string of memory cells 404, one or more of the sense amplifiers 420 can read a logic level in the selected memory cell 404 in response to a read current flowing in the memory array 402 through the selected string to the data lines 410.

One or more devices external to the memory device 400 can communicate with the memory device 400 using the I/O lines (DQ0-DQN) 408, address lines 416 (A0-AX), or control lines 432. The I/O circuit 426 can transfer values of data in or out of the memory device 400, such as in or out of the page buffer 422 or the memory array 402, using the I/O lines 408, according to, for example, the control lines 432 and address lines 416. The page buffer 422 can store data received from the one or more devices external to the memory device 400 before the data is programmed into relevant portions of the memory array 402, or can store data read from the memory array 402 before the data is transmitted to the one or more devices external to the memory device 400.

The column decoder 414 can receive and decode address signals (A0-AX) into one or more column select signals (CSEL1-CSELn). The selector 424 (e.g., a select circuit) can receive the column select signals (CSEL1-CSELn) and select data in the page buffer 422 representing values of data to be read from or to be programmed into memory cells 404. Selected data can be transferred between the page buffer 422 and the I/O circuit 426 using second data lines 418.

The memory control unit 430 can receive positive and negative supply signals, such as a supply voltage (Vcc) 434 and a negative supply (Vss) 436 (e.g., a ground potential), from an external source or supply (e.g., an internal or external battery, an AC-to-DC converter, etc.). In certain examples, the memory control unit 430 can include a regulator 428 to internally provide positive or negative supply signals.

Figure 5:
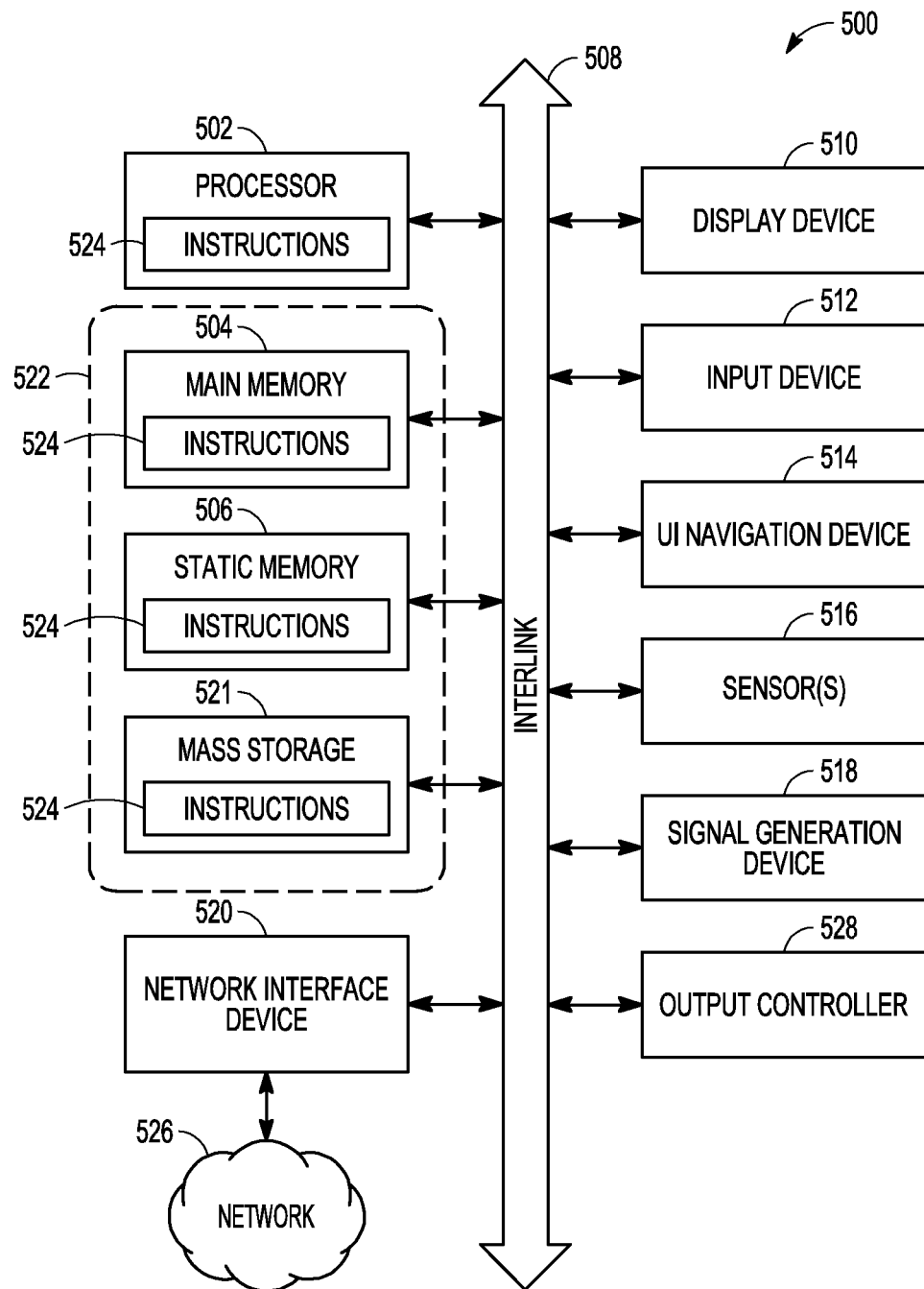
FIG. 5 is a block diagram illustrating an example of a machine upon which one or more embodiments may be implemented, according to various embodiments.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. The example machine 500 can be arranged to operate in the environment 100 of FIG. 1. The example machine 500 can include one or more memory devices having structures as discussed with respect to the memory array 200 of FIG. 2, the memory array 300 of FIG. 3, and the memory device 400 of FIG. 4.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 500 (e.g., the host device 105, the memory device 110, etc.) may include a hardware processor 502 (e.g., a CPU, a GPU, a hardware processor core, or any combination thereof, such as the memory processing device 115, etc.), a main memory 504 and a static memory 506, some or all of which may communicate with each other via an interlink (e.g., bus) 508. The machine 500 may further include a display device 510, an alphanumeric input device 512 (e.g., a keyboard), and a user interface (UI) navigation device 514 (e.g., a mouse). In an example, the display device 510, input device 512, and UI navigation device 514 may be a touch screen display. The machine 500 may additionally include a storage device (e.g., drive unit) 521, a signal generation device 518 (e.g., a speaker), a network interface device 520, and one or more sensors 516, such as a global positioning system (GPS) sensor, compass, accelerometer, or other sensor. The machine 500 may include an output controller 528, such as a serial (e.g., USB, parallel, or other wired or wireless (e.g., infrared (IR), near field communication (NFC), etc.) connection to communicate or control one or more peripheral devices (e.g., a printer, card reader, etc.).

The machine 500 may include a machine-readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 521 may constitute the machine-readable medium 522. The instructions 524 can include instructions for data management with respect an error log. Such data management can include dumping the error log to a memory in response to receiving a trigger to dump the error log.

While the machine-readable medium 522 is illustrated as a single medium, the term "machine-readable medium" may include a single medium or multiple media (e.g., a centralized or distributed database, or associated caches and servers) configured to store the one or more instructions 524.

The term "machine-readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., EPROM, EEPROM) and flash memory devices; magnetic disks, such as internal hard disks and removable disks; magneto-optical disks; and compact disc-ROM (CD-ROM) and digital versatile disc-read only memory (DVD-ROM) disks.

The instructions 524 (e.g., software, programs, an operating system (OS), etc.) or other data are stored on the storage device 521, can be accessed by the memory 504 for use by the processor 502. The memory 504 (e.g., DRAM) is typically fast, but volatile, and thus a different type of storage than the storage device 521 (e.g., an SSD), which is suitable for long-term storage, including while in an "off" condition. The instructions 524 or data in use by a user or the machine 500 are typically loaded in the memory 504 for use by the processor 502. When the memory 504 is full, virtual space from the storage device 521 can be allocated to supplement the memory 504; however, because the storage device 521 is typically slower than the memory 504, and write speeds are typically at least twice as slow as read speeds, use of virtual memory can greatly reduce user experience due to storage device latency (in contrast to the memory 504, e.g., DRAM). Further, use of the storage device 521 for virtual memory can greatly reduce the usable lifespan of the storage device 521.

In contrast to virtual memory, virtual memory compression (e.g., the Linux® kernel feature "ZRAM") uses part of the memory as compressed block storage to avoid paging to the storage device 521. Paging takes place in the compressed block until it is necessary to write such data to the storage device 521. Virtual memory compression increases the usable size of memory 504, while reducing wear on the storage device 521.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device and are often removable and separate components from the host device. In contrast, eMMC™ devices are attached to a circuit board and considered a component of the host device, with read speeds that rival SATA based SSD devices. However, demand for mobile device performance continues to increase, such as to fully enable virtual or augmented-reality devices, utilize increasing networks speeds, etc. In response to this demand, storage devices have shifted from parallel to serial communication interfaces. UFS devices, including controllers and firmware, communicate with a host device using a low-voltage differential signaling (LVDS) serial interface with dedicated read/write paths, further advancing greater read/write speeds.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any tangible medium that is capable of carrying instructions for execution by the machine 500, and includes instrumentalities to propagate digital or analog communications signals or other tangible medium, which can facilitate communication of software.

FIG. 6 is a block diagram of an embodiment of an example system 600 including a host 605 that operates with a memory device 610 in which the host 605 can detect one or more error conditions associated with the memory device 610 and transmit, in response to the detection of the one or more error conditions, a trigger signal to the memory device 610 to trigger a dump of an error log 613 in the memory device 610. The error log 613, which is actively being updated, may be maintained in a volatile memory, whose contents are subsequently saved to a non-volatile memory. The example system 600 can be implemented with respect to the environment 100 of FIG. 1. The example system 600 can be implemented with respect to memory device 610 having one or more individual memory device components having structures as discussed with respect to the memory array 200 of FIG. 2, the memory array 300 of FIG. 3, and the memory device 400 of FIG. 4.

In this example embodiment, the host 605 is coupled to an interface 617 of the memory device 610. The host 605 can interact with the memory device 610 to store user data to the memory device 610 and retrieve user data from the memory device 610 using the interface 617. Interchange of maintenance data, commands, responses to commands, signaling data, and other similar signals can be conveyed between the host 605 and the memory device 610 using the interface 617. The interface 617 coupling the host 605 and the memory device 610 can be implemented in a number of different ways. For example, the interface 617 can be implemented according to standard interface protocols correlated to the type of memory device to which the memory device 610 corresponds.

The memory device 610 can include a processing device 615 to manage operation of the memory device 610. The processing device 615 can include or be structured as one or more processors such as, but not limited to, a CPU. The processing device 615 can be structured as one or more memory controllers. The processing device 615 can store instructions for operating on the memory device 610 as a data storage device to store user data to a data storage 612 of the memory device 610 and retrieve user data from the data storage 612. The instructions can be stored in a management memory 616 of the processing device 615 or in components of the memory device 610 external to the processing device 615. The management memory 616 of the processing device 615 can comprise code executable by the processing device 615 to at least manage the data storage 612.

The management memory 616 can be structured as firmware containing the instructions. Alternatively, firmware 619 can reside in non-volatile memory, separate from the processing device 615, with instructions executable by the processing device 615. The firmware 619 can include code having instructions, executable by the processing device 615, to operate on the data storage 612. The data storage 612 can include one or more individual memory components. The one or more individual memory components can be implemented as, but are not limited to, individual NAND memory devices. The one or more individual memory components of data storage 612 can be realized in a number of formats including, but not limited to, multiple memory dies. The memory device 610 can be structured as, but not limited to, a SSD, a UFS device, or an eMMC device. For example, the memory device 610 can be structured as a mobile storage device. The memory device 610 can be structured as a managed NAND system.

In the example system 600, the processing device 615 is configured (e.g., hardware and/or software implementation) to perform operations with respect to dumping the error log 613, associated with one or more error conditions, to a memory component 614 of the memory device 610, in response to an identification that a signal received at the interface 617 of the memory device 610 is a signal to trigger the dump of the error log 613. The memory component 614 can be realized by a number of structures. The memory component 614 can be, but is not limited to, a SRAM, a ROM, or a portion of data storage 612. The error log 613 can include information associated with one or more of a data timeout, a data mismatch, a fatal error, an initialization timeout, and an identification of stuck firmware of the memory device.

The interface 617 can be implemented in a number of different formats. The interface 617 can include a GPIO to receive the dump signal. The interface 617 can include a UART to receive the dump signal. The interface 617 can be structured to receive the dump signal as a command to dump an error log to a memory component of the memory device 610. For a eMMC memory device, the command can be an eMMC command for real-time trigger task activation. For a UFS device, the command can be a UFS query request with a UPIU for enabling real-time trigger task activation. Memory device 610 can include a number of different formats in interface 617, where use of a particular format to handle a real-time trigger to dump error log 613 is selectable.

The dumping of the error log 613 can be handled by a component for a real-time trigger task 611. The real-time trigger can be signaled to the real-time trigger task 611 through an hardware interrupt handled by an interrupt service routine (ISR). The ISR of the real-time trigger can invoke or resume the real-time trigger task 611 in charge of dumping the system status of the memory device 610. The real-time trigger task 611 can be independent from task status of firmware that manages the memory device 610. Though the error log 613 is shown as part of the real-time trigger task 611, the error log 613 can be written to by other components of the memory device 610 upon determination of errors associated with operation of such components.

Instructions for handling identification of the trigger signal and the dumping of the error log 613 can be stored in dedicated instructions 618 that are separate from management memory 616 and separate from firmware 619 that controls data management for the memory device 610 for data storage. These dumping-related instructions can be executed by the processing device 615. With the processing device 615 having multiple processors, for example, one of these processors that make-up the processing device 615 can be used to execute instructions for handling identification of the trigger signal and the dumping of the error log 613.

In response to identification of a signal to trigger the dump of the error log 613, processing device 615 can execute instructions in the dedicated instructions 618 to dump the error log 613, associated with one or more error conditions, to the memory component 614. The operations in the dedicated instructions 618 can include operations for the memory device 610 to complete on-going tasks and save cached host data. The dedicated instructions 618 are disposed in a dedicated portion of the memory device 610, where the dedicated portion is separate from firmware that controls data management for the memory device 610 for data storage. The dedicated portion of the memory device can be a portion of a SRAM, a ROM, or a non-volatile portion of the data storage 612. The error log 613 being dumped to the memory component 614 can include hardware information and firmware information. The memory device 610 can transmit contents of the error log 613 to the host 605 for failure analysis.

The behavior of the memory device 610 after receiving a trigger signal that is a notification of an error event signal can include a number of actions. The memory device 610 can refrain from relying on main firmware (firmware 619 or management memory 616 depending on the implementation), which manages the memory device 610, to respond to a hardware error event toggle, since the main firmware may be stuck at that time. The dedicated error-dump firmware, such as dedicated instructions 618, can be implemented as a small size, which allows for it to permanently reside in SRAM or ROM after bootup. The dedicated error-dump firmware can dump a pre-defined application-specific integrated circuit (ASIC) registration (REG) address and selected SRAM region housing error log into one SLC block of the memory device 610. The running of the error-dump firmware can effectively be invisible to the main firmware. After completing the work correlated to the dump of the error log 613, the memory device 610 can choose to return the control of processing device 615 back to the main firmware, directly initiate a reset the memory device 610, or execute other operations associated with reacting to an error condition notification.

The signal, received at the interface 617 of the memory device 610, to trigger the dump of the error log 613 can be generated by the host 605 in response to detecting one or more error conditions associated with the memory device 610. In this example embodiment, the host 605 includes a host processor 604 that executes instructions stored in host memory 606. The host processor 604 can be implemented as one or more processors. The error conditions associated with the memory device 610 can include a data timeout, a data mismatch, a fatal error, an initialization timeout, a stuck system firmware identification, or other error condition associated with the memory device 610. For example, when a command from the host 605 is sent to the memory device 610, a response from the memory device 610 is expected in a specified amount of time. If the response is not received in the specified amount of time, a data timeout can occur. Once the error condition is detected, the host processor 604 can execute instructions stored in the host memory 606 to generate the trigger signal.

The trigger signal can be generated to be transmitted to the memory device 610, in response to the detection of the error condition, according to the interface format used by memory device 610. The trigger signal can be generated to be transmitted to a GPIO of the memory device 610 or to a UART of the memory device 610. In another interface format, the host processor 604 can be arranged to generate, in the signal to the memory device 610, a command to dump the error log to the memory component 614 of the memory device 612. With the memory device 610 implemented as an eMMC memory device, the command can be an eMMC command for real-time trigger task activation. The host 605 can generate and transmit CMD55 to enable failure analysis modality followed by ACMDxx to activate a real-time trigger task. With the memory device 610 implemented as a UFS memory device, the command can be a UFS query request with a UPIU for enabling real-time trigger task activation.

The trigger signal is sent by the host 605 to the memory device 610 to trigger a dump of the error log 613 in the memory component 614. This trigger signal is sent in response to a determination by the host 605 of an occurrence of one or more error conditions associated with the memory device 610. A decision to transmit the trigger signal to the memory device 610 can be based on a comparison of the number of error conditions or type of error conditions with respect to one of more thresholds for allowable error conditions. Triggering the dump of the error log 613 provides a mechanism for preserving the error log 613. Operations of the host 605 can include receiving the error log 613, dumped to the memory component 614 of the memory device 610, from the memory device 610 for error analysis. The host 605 can perform the error analysis using the received error log. The host 605 can send a portion of the error log 613 or information generated from the error log 613 to another system external to the host 605 and external to the memory device 610 for failure analysis. The portion can include the complete received error log. Communication to this other system can be over a network or combination of networks.

Figure 7:
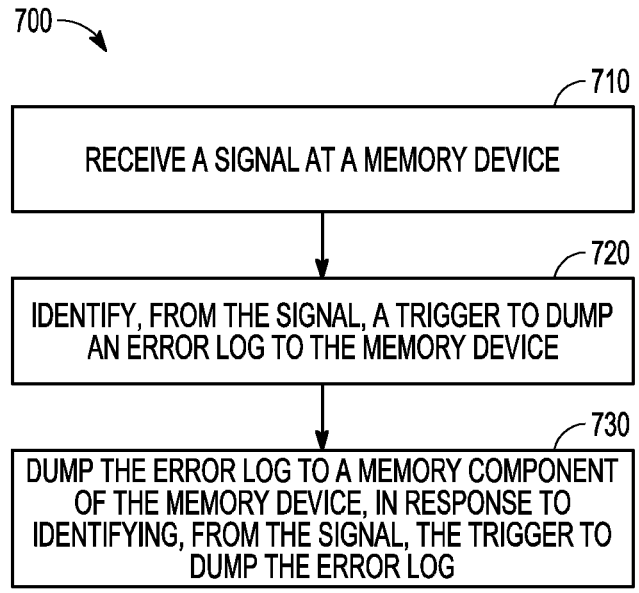
FIG. 7 is a flow diagram of features of an example method of preserving an error log of a memory device, according to various embodiments.

FIG. 7 is a flow diagram of features of an embodiment of an example method 700 of preserving an error log associated with a memory device. The example method 700 can be implemented with respect to the environment 100 of FIG. 1 and the example system 600 of FIG. 6. The example method 700 can be implemented with respect to one or more individual memory devices having structures as discussed with respect to the memory array 200 of FIG. 2, the memory array 300 of FIG. 3, and the memory device 400 of FIG. 4. At 710, a signal is received at the memory device. Receiving the signal can include receiving the signal at a GPIO node of the memory device, receiving the signal at a UART node of the memory device, or receiving the signal in a command at the memory device.

At 720, a trigger to dump the error log to the memory device is identified from the signal. The signal can include one or more data structures that identify that a current error log in the memory device is to be dumped to a memory component of the memory device, where the memory component is a non-volatile memory structure arranged for user data storage. For example, the signal can be received as a command to dump the error log to the non-volatile memory structure. The command depends on the format of the memory device. In various embodiments, the command can be an eMMC command for real-time trigger task activation.

In other embodiments, the command can be a UFS query request with a UPIU for enabling real-time trigger task activation.

At 730, the error log is dumped to a memory component of the memory device, in response to identifying, from the signal, the trigger to dump the error log. The error log can include hardware information and firmware information. The error log can include one or more of a data timeout, a data mismatch, a fatal error, an initialization timeout, and an identification of stuck firmware of the memory device. Instructions to dump the error log can be stored in a portion of the memory device, where the portion is separate from firmware that controls data management for the memory device for data storage.

Variations of the method 700 or methods similar to the method 700 can include a number of different embodiments that may be combined depending on the application of such methods and/or the architecture of systems in which such methods are implemented. Such methods can include completing, in the memory device, on-going tasks and saving cached host data in response to identifying the trigger from the signal. Operations of the memory device can include transmitting the error log, dumped to the memory component of the memory device, from the memory component to a host. The transmission of the error log to the host allows for the error log to be analyzed by the host or another system to which the host conveys the error log or information extracted from the error log.

In various embodiments, a memory device can comprise an interface to receive a signal at the memory device and one or more processors configured to execute instructions stored on one or more components in the memory device. Such instructions, when executed by the one or more processors, can cause the memory device to perform operations, where the operations comprise dumping an error log to a memory component of the memory device, in response to identifying, from the signal, a trigger to dump the error log. The interface can include a GPIO to receive the signal. The interface can include a UART to receive the signal. The interface can be structured to receive the signal as a command to dump the error log to the memory component of the memory device. In various embodiments, the interface can be structured to include a GPIO, a UART, and a command input to receive the signal to trigger the dump of the error log, where one of the GPIO, the UART, and the command input are selected by the memory device to receive such signals to trigger the error log dump.

Variations of such a memory device and its features, as taught herein, can include a number of different embodiments and features that may be combined depending on the application of such memory devices, the format of such memory devices, and/or the architecture in which such memory devices are implemented. Features of such memory devices can include the interface arranged to receive a command to dump the error log with the command being an eMMC command for real-time trigger task activation. In various embodiments, the interface arranged to receive a command to dump the error log with the command being a UFS query request with a UPIU for enabling real-time trigger task activation.

Variations of such a memory device and its features, as taught herein, can include instructions to dump the error being stored in a portion of the memory device, where the portion of the memory device is separate from firmware that controls data management for the memory device for data storage. The error log can be stored in data storage of the memory device that is used to store user data. For example, the error log can be stored in NAND memory of a managed NAND memory device. The error log can be stored in a SRAM of the memory device, a ROM of the memory device, or other non-volatile memory component of the memory device. The error log can include hardware information and firmware information. The error log can include one or more of a data timeout, a data mismatch, a fatal error, an initialization timeout, and an identification of stuck firmware of the memory device.

Variations of such a memory device and its features, as taught herein, can include the one or more processors of the memory device arranged to execute stored instruction of the memory device to perform additional operations. The operations can include transmitting the error log, dumped to the memory component of the memory device, from the memory component to a host. The host or another system to which the host conveys the error log or information extracted from the error log can conduct analysis of the error log transmitted by the memory device. Such analysis can be used to debug the memory device and allow for corrections to be made to the memory device or operation of the memory device. The memory device can be structured to include components to perform any functions associated with the method 700 of preserving an error log of a system for data storage or with the methods similar to method 700.

Figure 8:
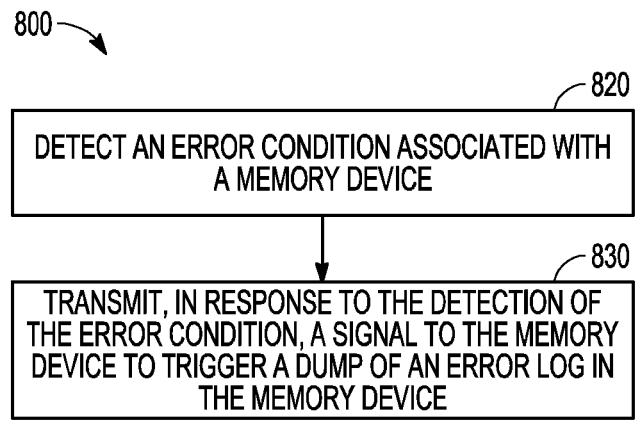
FIG. 8 is a flow diagram of features of an example method of preserving an error log in a memory device by a system that interfaces with the memory device, according to various embodiments.

FIG. 8 is a flow diagram of features of an embodiment of an example method 800 of preserving an error log in a memory device by a system that interfaces with the memory device. The example method 800 can be implemented with respect to the environment 100 of FIG. 1 and the example system 600 of FIG. 6. The example method 800 can be implemented with respect to one or more individual memory devices having structures as discussed with respect to the memory array 200 of FIG. 2, the memory array 300 of FIG. 3, and the memory device 400 of FIG. 4.

At 810, an error condition associated with the memory device is detected. At 820, a signal is transmitted, in response to the detection of the error condition, to the memory device to trigger a dump of an error log in the memory device. The signal to trigger the dump of the error log can be generated for transmission in one of different formats depending on the memory device and its functional format. Transmitting the signal can include transmitting the signal to a GPIO of the memory device or to a UART of the memory device. In forming the signal transmitted to the memory device, a command can be generated, in the signal, to dump the error log to the memory component of the memory device using a processor of the system that interfaces with the memory device.

Variations of the method 800 or methods similar to the method 800 can include a number of different embodiments that may be combined depending on the application of such methods and/or the architecture of systems in which such methods are implemented. Such methods can include the command to dump the error log in the memory device being sent in a command format by the system that interfaces with the memory device, where the command format can depend on the format of the memory device. In various embodiments, the command can be an eMMC command for real-time trigger task activation. In other embodiments, the command can be a UFS query request with a UPIU for enabling real-time trigger task activation.

Variations of the method 800 or methods similar to the method 800 can include receiving, in the system that interfaces with the memory device, the error log, which was dumped to the memory component of the memory device, from the memory device. Failure analysis can be performed using the received error log. The failure analysis can be performed by the system that interfaces with the memory device. The failure analysis can be performed by another system to which the host conveys the error log or information extracted from the error log.

In various embodiments, a system, which can interface with a memory device, can comprise one or more processors configured to execute instructions stored on one or more components in the system, which instructions, when executed by the processor, cause the system to perform operations. The operations can comprise: detecting an error condition associated with the memory device; and transmitting, in response to the detection of the error condition, a signal to the memory device to trigger a dump of an error log in the memory device. Transmitting the signal cam include transmitting the signal to a GPIO of the memory device or to a UART of the memory device.

Variations of systems that can interface with a memory device and features of such systems, as taught herein, can include a number of different embodiments and features that may be combined depending on the application of such system that can interface with a memory device, the format of interfacing with memory devices, and/or the architecture in which such systems are implemented. Features of such memory devices can include one or more processors arranged to generate, in the signal to the memory device, a command to dump the error log to the memory component of the memory device. The command can be an eMMC command for real-time trigger task activation. The command can be a UFS query request with a UPIU for enabling real-time trigger task activation.

Variations of systems that can interface with a memory device and features of such systems, as taught herein, can include the one or more processors of such systems arranged to execute stored instruction of such systems to perform additional operations. The operations can include receiving the error log, which was dumped to the memory component of the memory device, from the memory device. The operations can include performing failure analysis using the received error log. Such systems can convey, to one or more other systems, the received error log or information extracted from the error log, for the one or more other systems to perform failure analysis. Systems that can interface with a memory device and features of such systems can be structured to include components to perform any functions associated with the method 800 of preserving an error log of a system for data storage or with the methods similar to method 800.

The following are example embodiments of systems and methods, in accordance with the teachings herein.

An example memory device 1 can comprise: an interface to receive a signal at the memory device; and a processor configured to execute instructions stored on one or more components in the memory device, which instructions, when executed by the processor, cause the memory device to perform operations, the operations comprising dumping an error log to a memory component of the memory device, in response to identifying, from the signal, a trigger to dump the error log.

An example memory device 2 can include features of example memory device 1 and can include the interface including a general purpose input/output (GPIO) to receive the signal.

An example memory device 3 can include features of any of the preceding example memory devices and can include the interface including a universal asynchronous receiver/transmitter (UART) to receive the signal.

An example memory device 4 can include features of any of the preceding example memory devices and can include the interface being structured to receive the signal as a command to dump the error log to the memory component of the memory device.

An example memory device 5 can include features of example memory device 4 and any of the preceding example memory devices and can include the command being an embedded Multi-Media Controller (eMMC) command for real-time trigger task activation.

An example memory device 6 can include features of example memory device 4 and any of the preceding example memory devices and can include the command being a Universal Flash Storage (UFS) query request with a UFS protocol information unit (UPIU) for enabling real-time trigger task activation.

An example memory device 7 can include features of any of the preceding example memory devices and can include instructions to dump the error log being stored in a portion of the memory device, the portion being separate from firmware that controls data management for the memory device for data storage.

An example memory device 8 can include features of any of the preceding example memory devices and can include the error log including hardware information and firmware information.

An example memory device 9 can include features of any of the preceding example memory devices and can include the error log including one or more of a data timeout, a data mismatch, a fatal error, an initialization timeout, and an identification of stuck firmware of the memory device.

An example memory device 10 can include features of any of the preceding example memory devices and can include the operations to include transmitting the error log, dumped to the memory component of the memory device, from the memory component to a host.

In an example memory device 11, any of the memory devices of example memory devices 1 to 10 may include memory devices incorporated into an electronic system further comprising a host processor and a communication bus extending between the host processor and the memory device.

In an example memory device 12, any of the memory devices of example memory devices 1 to 11 may be modified to include any structure presented in another example memory device 1 to 11.

In an example memory device 13, any of apparatus of any of the memory devices of example memory devices 1 to 12 may further include a machine-readable storage device configured to store instructions as a physical state, wherein the instructions may be used to perform one or more operations of the apparatus.

In an example memory device 14, any of the example memory devices 1 to 13 may be adapted and operated to perform operations in accordance with any of the methods of the following example methods 1 to 6 of preserving an error log associated with a memory device.

An example method 1 of preserving an error log associated with a memory device can comprise: receiving a signal at the memory device; identifying, from the signal, a trigger to dump the error log to the memory device; and dumping the error log to a memory component of the memory device, in response to identifying, from the signal, the trigger to dump the error log.

An example method 2 of preserving an error log associated with a memory device can include features of example method 1 of preserving an error log associated with a memory device and can include receiving the signal to include receiving the signal at a general purpose input/output (GPIO), receiving the signal at a universal asynchronous receiver/transmitter (UART), or receiving the signal in a command.

An example method 3 of preserving an error log associated with a memory device can include features of any of the preceding example methods of preserving an error log associated with a memory device and can include completing, in the memory device, on-going tasks and saving cached host data in response to identifying the trigger from the signal.

In an example method 4 of preserving an error log associated with a memory device, any of the example methods 1 to 3 of preserving an error log associated with a memory device may be performed by an electronic system including a host processor and a communications interface extending between the host processor and a memory device.

In an example method 5 of preserving an error log associated with a memory device, any of the example methods 1 to 4 of preserving an error log associated with a memory device may be modified to include operations set forth in any other of method examples 1 to 4 of preserving an error log associated with a memory device.

In an example method 6 of preserving an error log associated with a memory device, any of the example methods 1 to 5 of preserving an error log associated with a memory device may be implemented at least in part through use of instructions stored as a physical state in one or more machine-readable storage devices.

An example method 7 of preserving an error log associated with a memory device can include features of any of the preceding example methods 1 to 6 of preserving an error log associated with a memory device and can include performing functions associated with any features of example memory devices 1 to 13.

An example machine-readable storage device 1 storing instructions, that when executed by one or more processors, cause a machine to perform operations, can comprise instructions to perform functions associated with any features of example memory devices 1 to 14 or perform methods associated with any features of example methods 1 to 7 of preserving an error log associated with a memory device.

An example system 1 to interface with a memory device can comprise: a processor configured to execute instructions stored on one or more components in the system, which instructions, when executed by the processor, cause the system to perform operations, the operations comprising: detecting an error condition associated with the memory device; and transmitting, in response to the detection of the error condition, a signal to the memory device to trigger a dump of an error log in the memory device.

An example system 2 to interface with a memory device can include features of example system 1 to interface with a memory device and can include transmitting the signal to include transmitting the signal to a general purpose input/output (GPIO) of the memory device or to a universal asynchronous receiver/transmitter (UART) of the memory device.

An example system 3 to interface with a memory device can include features of any of the preceding example systems to interface with a memory device and can include the processor being arranged to generate, in the signal to the memory device, a command to dump the error log to the memory component of the memory device.

An example system 4 to interface with a memory device can include features of example system 3 to interface with a memory device and any of the preceding example systems to interface with a memory device and can include the command being an embedded Multi-Media Controller (eMMC) command for real-time trigger task activation.

An example system 5 to interface with a memory device can include features of example system 3 to interface with a memory device and any of the preceding example systems to interface with a memory device and can include the command being a Universal Flash Storage (UFS) query request with a UFS protocol information unit (UPIU) for enabling real-time trigger task activation.

An example system 6 to interface with a memory device can include features of any of the preceding example systems to interface with a memory device and can include the operations to include receiving the error log, dumped to the memory component of the memory device, from the memory device.

An example system 7 to interface with a memory device can include features of example system 6 to interface with a memory device and any of the preceding example systems to interface with a memory device and can include the operations to include performing failure analysis using the received error log.

In an example system 8 to interface with a memory device, any of the systems to interface with a memory device of example systems 1 to 7 to interface with a memory device may include memory devices incorporated into an electronic system further comprising a host processor and a communication bus extending between the host processor and the memory device.

In an example system 9 to interface with a memory device, any of the systems of example systems 1 to 8 to interface with a memory device may be modified to include any structure presented in another example system 1 to 8 to interface with a memory device.

In an example system 10 to interface with a memory device, any of apparatus of any of the systems of example systems 1 to 9 to interface with a memory device may further include a machine-readable storage device configured to store instructions as a physical state, wherein the instructions may be used to perform one or more operations of the apparatus.

In an example system 11 to interface with a memory device, any of the systems of example systems 1 to 10 to interface with a memory device may be adapted and operated to perform operations in accordance with any of the methods of the following example methods 1 to 10 of preserving an error log in a memory device by a system that interfaces with the memory device.

An example method 1 of preserving an error log in a memory device by a system that interfaces with the memory device can comprise detecting an error condition associated with the memory device; and transmitting, in response to the detection of the error condition, a signal to the memory device to trigger a dump of an error log in the memory device.

An example method 2 of preserving an error log in a memory device by a system that interfaces with the memory device can include features of example method 1 of preserving an error log in a memory device by a system that interfaces with the memory device and can include transmitting the signal to include transmitting the signal to a general purpose input/output (GPIO) of the memory device or to a universal asynchronous receiver/transmitter (UART) of the memory device.

An example method 3 of preserving an error log in a memory device by a system that interfaces with the memory device can include features of any of the preceding example methods of preserving an error log in a memory device by a system that interfaces with the memory device and can include generating, in the signal to the memory device using a processor, a command to dump the error log to the memory component of the memory device.

An example method 4 of preserving an error log in a memory device by a system that interfaces with the memory device can include features of example method 3 of preserving an error log in a memory device by a system that interfaces with the memory device and any of the preceding example methods of preserving an error log in a memory device by a system that interfaces with the memory device and can include the command being an embedded Multi-Media Controller (eMMC) command for real-time trigger task activation.

An example method 5 of preserving an error log in a memory device by a system that interfaces with the memory device can include features of example method 3 of preserving an error log in a memory device by a system that interfaces with the memory device and any of the preceding example methods of preserving an error log in a memory device by a system that interfaces with the memory device and can include the command being a Universal Flash Storage (UFS) query request with a UFS protocol information unit (UPIU) for enabling real-time trigger task activation.

An example method 6 of preserving an error log in a memory device by a system that interfaces with the memory device can include features of any of the preceding example methods of preserving an error log in a memory device by a system that interfaces with the memory device and can include receiving, in the system, the error log, dumped to the memory component of the memory device, from the memory device.

An example method 7 of preserving an error log in a memory device by a system that interfaces with the memory device can include features of any of the preceding example methods of preserving an error log in a memory device by a system that interfaces with the memory device and can include performing failure analysis using the received error log.

In an example method 8 of preserving an error log in a memory device by a system that interfaces with the memory device, any of the example methods 1 to 7 of preserving an error log in a memory device by a system that interfaces with the memory device may be performed by an electronic system including a host processor and a communications interface extending between the host processor and a memory device.

In an example method 9 of preserving an error log in a memory device by a system that interfaces with the memory device, any of the example methods 1 to 8 of preserving an error log in a memory device by a system that interfaces with the memory device may be modified to include operations set forth in any other of method examples 1 to 8 of preserving an error log in a memory device by a system that interfaces with the memory device.

In an example method 10 of preserving an error log in a memory device by a system that interfaces with the memory device, any of the example methods 1 to 9 of preserving an error log in a memory device by a system that interfaces with the memory device may be implemented at least in part through use of instructions stored as a physical state in one or more machine-readable storage devices.

An example method 11 of preserving an error log in a memory device by a system that interfaces with the memory device can include features of any of the preceding example methods 1 to 10 of preserving an error log in a memory device by a system that interfaces with the memory device and can include performing functions associated with any features of example systems 1 to 10 to interface with a memory device.

An example machine-readable storage device 2 storing instructions, that when executed by one or more processors, cause a machine to perform operations, can comprise instructions to perform functions associated with any features of example systems 1 to 11 to interface with a memory device or perform methods associated with any features of example methods 1 to 11 of preserving an error log in a memory device by a system that interfaces with the memory device.

Techniques, as taught herein, provide debug efficiency for failures found on an operational memory device. The operational memory device can be but is not limited to a mobile phone. Such techniques can enable failure analysis in most, if not any, stuck condition or error condition of a memory device. Such techniques can allow the dumping of all device information, both hardware and firmware. These approaches can provide a non-intrusive failure analysis approach, which can include avoiding re-testing. Such techniques can be implemented without device de-soldering for failure analysis. In addition, these techniques can be implemented in an independent manner by protocols of the specification under which the memory device functions, for example using eMMC protocols different from UFS protocols.

In various examples, the components, controllers, processors, units, engines, or tables described herein can include, among other things, physical circuitry or firmware stored on a physical device. As used herein, "processor device" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer-readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, RAMs, ROMs, SSDs, UFS devices, eMMC devices, and the like.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. The above description is intended to be illustrative, and not restrictive, and that the phraseology or terminology employed herein is for the purpose of description. In addition, in the foregoing Detailed Description, it can be seen that various features are grouped together in a single embodiment for the purpose of streamlining the disclosure. Combinations of the above embodiments and other embodiments will be apparent to those of skill in the art upon studying the above description.

What is claimed is:

1. A host system to interface with a memory device, the host system comprising:
    a processor configured to execute instructions stored on one or more components in the host system, which instructions, when executed by the processor, cause the host system to perform operations, the operations comprising:
        detecting, within the host system, a number of an error conditions associated with the memory device;
        comparing the number of error conditions with respect to one or more thresholds for allowable error conditions; and
        transmitting, in response to the comparison of the error conditions, a trigger signal to the memory device to dump an error log in the memory device, using a standardized protocol including the trigger signal, using a format selected in the host system from three or more formats to handle the trigger signal.

2. The host system of claim 1, wherein the error conditions include one or more of a data timeout, a data mismatch, a fatal run error, an initialization timeout, or a stuck system firmware identification.

3. The host system of claim 1, wherein transmitting the trigger signal includes generating a customized embedded Multi-Media Controller (eMMC) command or a sequence of eMMC customized commands defined as the trigger signal.

4. The host system of claim 1, wherein transmitting the trigger signal includes generating a customized Universal Flash Storage (UFS) query request with a UFS protocol information unit (UPIU) with an application opcode defined to trigger dump of the error log.

5. The host system of claim 1, wherein the processor is operable to perform error analysis on the error log in response to reception of the error log from the memory device.

6. The host system of claim 1, wherein the processor is operable to transmit the error log to another system external to the host system, in response to reception of the error log from the memory device.

7. A memory device comprising:
    an interface to receive a signal at the memory device; and
    a processor configured to execute instructions stored on one or more components in the memory device, which instructions, when executed by the processor, cause the memory device to perform operations, the operations comprising:
        interpreting, using a standardized protocol in the received signal, presence of a trigger signal to dump an error log of the memory device to a non-volatile memory storage in the memory device; and
        dumping the error log to the non-volatile memory storage of the memory device, in response to identifying the trigger signal in the received signal, including dumping a pre-defined application-specific integrated circuit registration address and a selected region of the non-volatile memory storage of the memory housing the error log into one single-level cell block of the memory device.

8. The memory device of claim 7, wherein the interface is structured to receive the signal as a command to dump the error log to the non-volatile memory storage of the memory device.

9. The memory device of claim 8, wherein the command is an embedded Multi-Media Controller (eMMC) command for real-time trigger task activation.

10. The memory device of claim 8, wherein the command is a Universal Flash Storage (UFS) query request with a UFS protocol information unit (UPIU) for enabling real-time trigger task activation.

11. The memory device of claim 7, wherein the memory device is operable to complete on-going tasks and save cached host data in response to identifying the trigger from the signal identifying the trigger signal.

12. The memory device of claim 7, wherein the instructions to dump the error log are stored in a portion of the memory device arranged with the portion being separate from firmware that controls data management for the memory device for data storage.

13. The memory device of claim 12, wherein the processor is arranged to refrain from relying on the firmware in dumping the error log.

14. The memory device of claim 12, wherein, after completing work correlated to the dump of the error log, the processor is operable to return control of the processor back to the firmware, directly initiate a reset of the memory device, or execute other operations associated with reacting to an error condition notification.

15. The memory device of claim 7, wherein the error log includes hardware information and firmware information.

16. The memory device of claim 7, wherein the error log is maintained in a volatile memory of the memory device prior to dumping the error log to the non-volatile memory storage.

17. The memory device of claim 7, wherein the processor is operable to transmit the error log, dumped to the non-volatile memory storage of the memory device, from the non-volatile memory storage to a host external to the memory device.

18. A memory device comprising:
    an interface to receive a signal at the memory device;
    non-volatile memory storage;
    a memory component to store dedicated instructions to dump an error log of the memory device to the non-volatile memory storage in the memory device; and
    a processor configured to execute instructions stored on one or more components in the memory device, which instructions, when executed by the processor, cause the memory device to perform operations, the operations comprising:
        interpreting, using a standardized protocol in the received signal, presence of a trigger signal to dump the error log of the memory device to the non-volatile memory storage in the memory device;
        invoking, via an interrupt service routine, a trigger task of the dedicated instructions, the trigger task in charge of dumping the error log; and
        dumping the error log to the non-volatile memory storage of the memory device, in response to identifying the trigger signal in the received signal, including dumping a pre-defined application-specific integrated circuit registration address and a selected region of the non-volatile memory storage of the memory housing the error log into one single-level cell block of the memory device.

19. The memory device of claim 18, wherein the error log is structured to be written to by multiple components of the memory device upon determination of errors associated with operation of the multiple components.

20. The memory device of claim 18, wherein the memory component to store the dedicated instructions includes a static random access memory or a read-only memory in which the dedicated instructions permanently reside after bootup.

* * * * *